Patented May 15, 1951

2,552,908

UNITED STATES PATENT OFFICE 2,552,908

PROCESS FOR CONCENTRATION OF NEOVITAMIN A

Charles D. Robeson, Rochester, N. Y., assignor, by mesne assignments, to Eastman Kodak Company, Rochester, N. Y., a corporation of New Jersey No Drawing. Continuation of application Serial No. 555,405, September 22, 1944. This application December 12, 1947, Serial No. 791,449

3 Claims. (Cl. 260—617)

This application is a continuation of Serial No. 555,405, filed September 22, 1944, now abandoned.

This invention relates to improved procedure for preparation of products having vitamin activity and to improved vitamin A products.

An object of the invention is to provide a new vitamin A product having improved properties. Another object is to provide improved procedure for preparing new vitamin A active substances. Another object is to improve the state of the art. Other objects will appear hereinafter.

These and other objects are accomplished by my invention which includes separating substantially all of the ordinary or known vitamin A from the non-saponifiable matter of a fish oil, and then subjecting the residue freed of known vitamin A to a treatment for removal of a substance which has substantially different properties from known vitamin A, but which exhibits high vitamin A activity.

In the following examples and description I have set forth several of the preferred embodiments of my invention, but it is to be understood that these are given for the purpose of illustration and not in limitation thereof.

The non-saponifiable matter may be obtained from the fish oil in any desired manner. Likewise the non-saponifiable matter may be freed of its ordinary vitamin A alcohol content in any of the known ways. Thus, for instance, the non-saponifiable matter may be obtained by direct saponification of the fish oil. A more economical method is first to subject the fish oil to molecular distillation to separate a vitamin A concentrate as a distillate and then to saponify this distillate to obtain the non-saponifiable matter. The removal of the known vitamin A from the non-saponifiable matter may be accomplished, for example, by crystallizing the vitamin A alcohol from a solution thereof in a solvent such as ethyl formate. This solution is usually cooled to a low temperature such as −35° C. to form the vitamin A alcohol crystals. Substantially complete removal of the vitamin A alcohol may in certain cases require repeated crystallization.

The residue freed as above from its known vitamin A alcohol content is then treated to separate the new vitamin A active substance (hereinafter referred to as neo-vitamin A). The two methods which have been found best for this procedure are chromatographic adsorption and crystallization from solvents or a combination thereof. Suitable adsorbents are: zeolites such as "Doucil" (a manufactured sodium aluminum silicate), silica gel, activated aluminum oxide, calcium hydroxide, zinc carbonate, activated carbon, etc. The adsorbent may be contacted with the residue containing the new vitamin A active substance in any desired manner. Thus, a solution of the residue in a suitable solvent may be passed through an adsorption column containing the adsorbent. The neo-vitamin A becomes adsorbed thereon and is then eluted from the column with a solvent. Also, it is feasible merely to stir the adsorbent with the solvent solution containing the neo-vitamin A residue, separate the adsorbent, and then elute the neo-vitamin A therefrom. Crystallization may be accomplished by dissolving the residue in a suitable solvent and cooling to a low temperature, or if desired, the neo-vitamin A contained in the residue can be reacted with an acid derivative to form an ester having crystallizable properties, and these esters then may be crystallized from solution by cooling. The crystalline esters thus obtained may be directly used, or it may be advantageous to saponify them and thus obtain the purified neo-vitamin A alcohol which then can be separated from the saponified mixture and crystallized from a solvent as described above. The fact that neo-vitamin A forms a mono ester clearly shows that it is an alcohol.

It has been discovered that fish body and liver oils as a class contain neo-vitamin A and may be used as a starting material. If the oil is low in vitamin A content, it should preferably be concentrated by high-vacuum unobstructed path distillation before saponification. Examples of suitable oils are cod liver, sardine, pollack liver and shark liver oils.

The properties of neo-vitamin A are compared with those of known vitamin A alcohol in Table I and with the same ester, i.e. neo-vitamin A esters with vitamin A esters, in Table II.

Table I

|  | Crystalline Structure | M. P. | Wave-length of absorption maximum | Extinction coefficient $E_{1cm}^{1\%}$ | Relative Adsorption on Doucil | M. P. Anthraquinone Carboxylate | Relative Rate of Dehydration by Alc. HCl | Recovery of vitamin A in olive oil sol. after 1 hr. exposure to air at 55° C. By Baxter Rocker Equipment |
|---|---|---|---|---|---|---|---|---|
|  |  | Degrees | Mµ |  |  | 121–122° |  | Per cent |
| Vit. A | Yellow prisms | 62–64 | 325 | 1,750 | Strong | Yellow | Fast | 65 |
| Neo Vit. A | Light yellow feathery crystals | 59–60 | 328 | 1,645 | Weak | 134–136° Red | Slow | 90 |

(Ext. coeff. and abs. max. were measured on ethyl alcohol solutions of the vitamin A compounds by the Hilger quartz spectograph, model E-498 with a Spekker U. V. photometer. Light source—Tungsten steel spark.)

Table II

|  | Crystalline Structure | M. P. Azoyl Ester | L Value of Azo Ester | Extinction coefficient $E_{1cm}^{1\%}$ (328) | $E_{1cm}^{1\%}$ (620) of antimony trichloride Blue color | Relative rate of dehydration in alcohol |
|---|---|---|---|---|---|---|
|  |  | Degrees |  |  |  |  |
| Vit. A Azoate | Red, Orange Prisms | 79–80 | 2,340 | 1,495 | 2,330 | Fast. |
| Neo Vit. A Azoate | Orange or Rust feathery Needles. | 94–96 | 2,100 | 1,460 | 2,230 | Slow. |

(The L value is a measure of the intensity of the antimony trichloride blue color as measured by Evelyn photoelectric colorimeter and is analogous to $E_{1cm}^{1\%}$ (620 mµ).

*Example*

(A) *Saponification.*—113 grams of a vitamin A ester concentrate prepared by high-vaccum distillation of ling cod liver oil (E (1%, 1 cm.) =500) at 328 mµ was saponified for 30 minutes at 70° C. by 318 cc. of 2 N alcoholic KOH, in an atmosphere of nitrogen. The non-saponifiable matter was obtained by diluting the reaction mixture with water and extracting with ether according to the well known procedure. After removing the solvent 42.5 g. of non-saponifiable containing vitamin A alcohol (E (1%, 1 cm.) =1110) 328 mµ was obtained as a dark red viscous oil.

(B) *Crystallization to remove vitamin A alcohol*—.The non-saponifiable from (A) was dissolved in 300 cc. of ethyl formate and cooled to −35° C. After 18 hours the precipitated sterols (7.05 g.) were filtered. Re-cooling the filtrate to −80° C. caused no more solids to deposit, so the solution was seeded with a few crystals of vitamin A alcohol. In two days the precipitation of vitamin A was complete and the crystals were removed by filtration.

(C) *Preparation of neo-vitamin A and azo benzene carboxylates.*—The filtrate residue from (B) was freed of ethyl formate by distillation under vacuum and the residue (20 grams, $E_{1cm}^{1\%}$ (328 mµ=1150))

was dissolved in petroleum ether to make 150 cc. of solution which was chromatographed on a column (45 mm. diameter) of Doucil (a sodium aluminum silicate) (250 gms.) and washed with additional petroleum ether until a yellow-orange zone reached the bottom of the column. The column was removed in four equal sections which were separately eluted with ethyl ether containing 5% methyl alcohol. Thus, there was obtained five fractions as shown in Table III.

Table III

| Fraction | Blank | Wt. | $E_{1cm}^{1\%}$ (328 mµ) | Anhydro Vit. A $E_{1cm}^{1\%}$ (392 mµ) | Per Cent Neo Vitamin A |
|---|---|---|---|---|---|
| 1 | Orig. Filtrate | 2.5 |  |  |  |
| 2 | Sec. 1 of Column (Bottom) | 8.7 | 1,040 | 227 | [1] 88 |
| 3 | Sec. 2 of Column | 3.5 | 1,485 | 40.8 | 40 |
| 4 | Sec. 3 of Column | 3.1 | 1,440 | 43.1 | 30 |
| 5 | Sec. 4 of Column (Top) | 2.1 | 1,350 |  |  |

[1] Abnormally high because of presence of anhydro vitamin A which interferes with the determination.

Fraction 2 from the first chromatograph was rechromatographed on Doucil (a sodium aluminum silicate) (125 gms.) and well washed with additional petroleum ether. Elution of the bottom half of the column with ether containing 5% methyl alcohol yielded a fraction (4.9 gm. I) with $$E_{1cm}^{1\%} \; 328 \; m\mu = 1275$$

and $$E_{1cm}^{1\%} \; 392 = 24$$

which contained approximately 75% neo-vitamin A. To this neo-vitamin A concentrate (4.9 gm.) in methylene chloride (30 cc.) and pyridine (5 cc.) was slowly added azo benzene carboxyl chloride (4.25 gms.) in methylene chloride (30 cc.) After standing 5 hours at room temperature, water (2 cc.) was added and the reaction mixture warmed to 50° to hydrolyze any excess acid chloride. The methylene chloride solution was then poured into 5% HCl (200 cc.) and extracted with ether (300 cc.). The ether extract was washed with 5% HCl to remove pyridine, N/5 KOH, and finally with water to neutrality. The solvent was evaporated after drying by filtration through sodium sulfate yielding a red oil (8.5 gm.) Petroleum ether (100 cc.) was added and the solution filtered and washed through a column of Doucil (a sodium aluminum silicate) to remove the azoic anhydride with which the product was contaminated. The petroleum ether filtrate and washings were concentrated to 75 cc. and cooled to —35° C. which caused crystallization of the neo-vitamin A azo benzene carboxylate (3.1 gm.). After two recrystallizations of the ester from petroleum ether at 25°, the orange crystals (1.35 gm., II) were dried under vacuum, feathery needles, melting point 94-96°;

$$E_{1\,cm.}^{1\%} \ 330 \ m\mu = 1460$$

A depression of melting point occurred when mixed with a sample of vitamin A azo benzene carboxylate.

Neo-vitamin A azoate (1 gm., II) was dissolved in 10 cc. of boiling alcohol, and 4 cc. of 4 N alcoholic KOH was added. The mixture was refluxed for 15 minutes. After pouring into water (50 cc.) and extracting with ether (100 cc.) the ether extract was washed with N/5 KOH and water, dried over sodium sulfate, filtered and evaporated to yield neo-vitamin A as a viscous yellow oil (.6 gm.) which crystallized from ethyl formate (2 cc.) at —35°. The pale yellow needles of neo-vitamin A were filtered and dried under vacuum M. P. 59-60°;

$$E_{1\,cm.}^{1\%} = 1645$$

When mixed with vitamin A (M. P. 62-64°) a depression in the melting point to approximately 54° was observed.

The data on rates of dehydration show that the neo-vitamin A in alcohol form is more stable to acid than known vitamin A and that the ester is more stable to action of alcohols than the same ester of known vitamin A.

The vitamin A azo benzene carboxylate mentioned above was prepared from crystalline vitamin A M. P. 62-64° C. and azo benzene carboxyl chloride using the procedure as described for neo-vitamin A azo benzene carboxylate. Reddish orange prisms melting point 79.5-80°;

$$E_{1\,cm.}^{1\%} \ 330 \ m\mu = 1460$$

Anthraquinone beta-carboxylate of neo-vitamin A is prepared as follows: To a solution of neo-vitamin A (0.15 g.) in methylene chloride (1 cc.) and pyridine (0.2 cc.) was added a solution of anthraquinone beta-carboxyl chloride (0.15 g.) in benzene (4 cc.). After standing at 25° for four hours, the esterification mixture was poured into 5% HCl (15 cc.) and extracted with ether (20 cc.). The ether extract was washed with 5% HCl to remove pyridine, N/5 KOH, and finally with water to neutrality. Evaporation of the solvent yielded a red viscous oil 0.2 g.) which crystallized from acetone (2 cc.) at 0°. Recrystallization from acetone at 25° yielded red rosette like crystals M. P. 134-136° C.

Substitution of vitamin A for neo-vitamin in the above procedure yielded yellow plate like crystals. M. P. 121-122° C.

Vitamin A has the following structural formula:

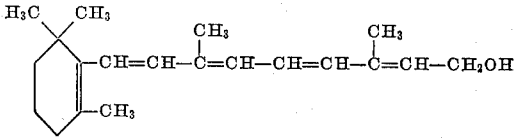

Vitamin A

It can be seen that the double bond nearest the hydroxyl group enables the molecule to occur in either cis or trans form. The new vitamin A active substance prepared in accordance with the present invention and termed neo-vitamin A has been found to have the following cis configuration:

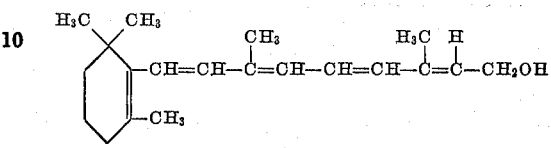

Neo-vitamin A

The corresponding trans isomer is the previously known vitamin A.

While the invention has been described in considerable detail in connection with certain preferred procedures and materials, it will be understood that modifications and variations may be effected therein without departing from the spirit and scope of the invention as it is defined by the appended claims.

What I claim is:

1. The process of preparing a concentrate of neo-vitamin A having greater stability to oxidation than vitamin A and having substantial vitamin A activity, which process comprises saponifying a fish oil, separating the saponified portion of said oil from the unsaponified portion thereof, separating vitamin A alcohol from said unsaponified portion and thereby leaving a residual portion containing neovitamin A, and thereafter separating and concentrating said neovitamin A from said residual portion by subjecting said residual portion to chromatographic adsorption effective to adsorb said neovitamin A, and separately eluting said neovitamin A and thereby obtaining a concentrate of neovitamin A containing a substantially higher percentage of neovitamin A than said fish oil and being substantially free of vitamin A.

2. The process of preparing material characterized by having substantial vitamin A biological activity and having greater stability to oxidation than vitamin A, which process comprises saponifying a fish oil, separating the saponified portion of said fish oil from the unsaponified portion thereof, separating vitamin A alcohol from said unsaponified portion and thereby leaving a residual portion containing neovitamin A, separating and concentrating said neovitamin A from said residual portion by subjecting said residual portion to chromatographic adsorption effective to adsorb said neovitamin A and separately eluting said adsorbed neovitamin A, esterifying said separated and concentrated neovitamin A, and crystallizing out the resulting esterified neovitamin A.

3. The process of preparing a concentrate of neovitamin A characterized by having substantial vitamin A activity and having greater stability against oxidation than vitamin A, which process comprises saponifying a fish oil, separating the saponified portion of said fish oil from the unsaponified portion thereof, crystallizing vitamin A from said unsaponified portion and thereby leaving a residual portion containing neovitamin A, passing said residual portion through a body of adsorbent and thereby adsorbing said neovitamin A separately from the remainder of said residual portion, separately eluting said adsorbed neovitamin A, and evaporating the resulting eluate and thereby recovering a neovitamin A concentrate substantially free of vitamin A.

CHARLES D. ROBESON.

REFERENCES CITED

The following references are of record in the file of this patent:

UNITED STATES PATENTS

| Number | Name | Date |
|---|---|---|
| 2,111,049 | Holmes | Mar. 15, 1938 |
| 2,173,629 | Milas | Sept. 19, 1939 |

OTHER REFERENCES

Baxter et al.: Jour. of Biol. Chem., vol. 141, 991-2 (1941).